United States Patent [19]
Stracek

[11] 3,714,517
[45] Jan. 30, 1973

[54] ELECTRICAL GROUNDING SYSTEM
[75] Inventor: Robert J. Stracek, Mount Prospect, Ill.
[73] Assignee: Chemetron Corporation, Chicago, Ill.
[22] Filed: Feb. 10, 1971
[21] Appl. No.: 114,132

[52] U.S. Cl. ............... 317/123, 317/18 B, 317/154, 340/255
[51] Int. Cl. ............................................. H02h 3/14
[58] Field of Search ..... 340/255, 256; 317/18 B, 154, 317/9 R, 9 A, 9 D, 18 R, 18 A, 157; 307/92, 94, 98, 142

[56] References Cited

UNITED STATES PATENTS

| | | | |
|---|---|---|---|
| 3,426,342 | 2/1969 | De Langis | 317/18 B |
| 3,244,937 | 4/1966 | Blackburn | 317/9 R |
| 3,176,219 | 3/1965 | Behr | 317/18 B |
| 2,554,598 | 5/1951 | Stirch | 317/18 B |

*Primary Examiner*—William M. Shoop, Jr.
*Assistant Examiner*—Harry E. Moose, Jr.
*Attorney*—Nicholas M. Esser

[57] ABSTRACT

An improved ground protecting circuit designed to require grounding of the chassis of electrical apparatus for continued operation of the apparatus after a switch, which has been closed to initiate the operation of the apparatus through the ground protecting circuit, is opened.

11 Claims, 4 Drawing Figures

PATENTED JAN 30 1973 3,714,517
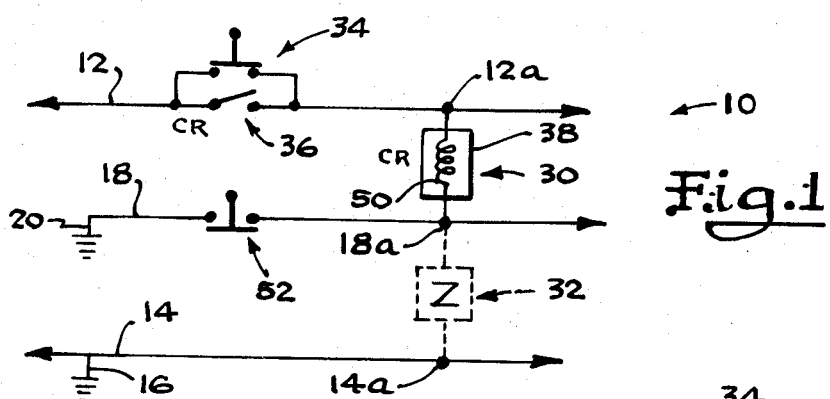
Fig.1
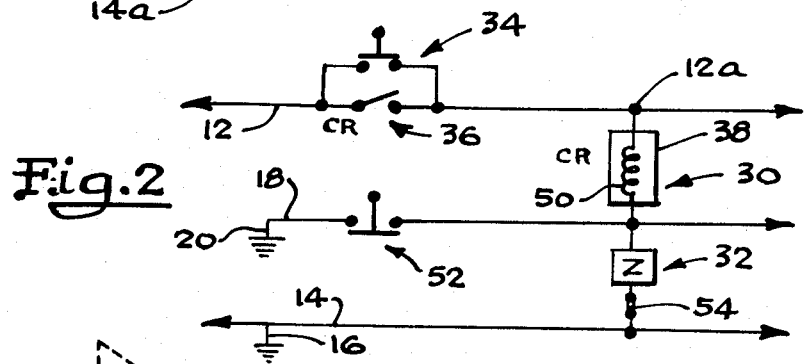
Fig.2
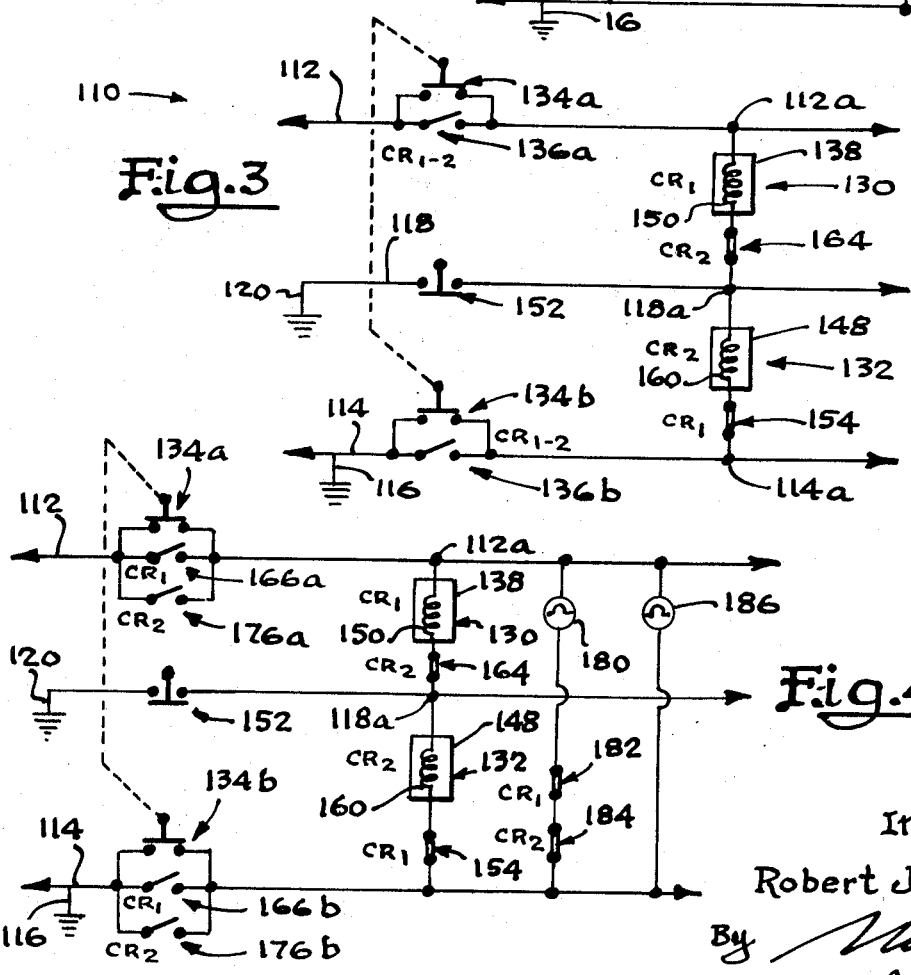
Fig.3
Fig.4
Inventor
Robert J. Stracek
By [signature]
Attorney

ELECTRICAL GROUNDING SYSTEM

BACKGROUND OF THE INVENTION

This invention pertains generally to an improved ground protecting circuit designed to require grounding of the chassis of electrical apparatus for continued operation of the apparatus after a switch, which has been closed to initiate the operation of the apparatus through the ground protecting circuit, is opened.

A conventional low voltage alternating current power line (typically 110–115 volts) is grounded on one side. Thus, it is a common safety expedient to provide an electrical apparatus not only with a pair of line conductors but also with a neutral conductor connected to the chassis of the apparatus and adapted to be grounded. Frequently, both the line conductors and the neutral conductor lead to a non-symmetrical three-prong plug, which is adapted to be connected to a suitable three-socket outlet, in order to facilitate not only proper connection of the line conductors to the power line but also proper connection of the neutral conductor to ground. However, often either through oversight or by design in the installation of the three-socket outlet, the connection of the neutral conductor to ground through the connection of the three-prong plug to the three-socket outlet may be incomplete. Also, means such as a two-prong adapter often can be used to connect the three-prong plug to a conventional two-socket outlet. In the latter instance, even if the two-prong adapter is provided with a pigtail for connection of the neutral conductor to ground, often either no proper connection of the neutral conductor to ground has been made initially or a later fault may occur in such connection.

In U. S. Pat. No. 3,426,342, there are disclosed various ground protecting circuits respectively designed to disconnect a pair of line conductors from a load in the absence of a connection of a neutral conductor to ground. Several of the circuits disclosed respectively comprise a relay having center tapped coil windings connected across the line conductors with the neutral conductor connected to the center tap. In each of these circuits, either one or both of the windings will carry substantial current so long as the line conductors are connected to a suitable source, and the relay is arranged to close a set of otherwise opened contacts connected in each of the line conductors between the windings and the load if both the neutral conductor and one of the line conductors are grounded. Because either one or both of the windings will carry substantial current so long as the line conductors are connected to the source, whether or not the neutral conductor is grounded, the neutral conductor will remain energized even if it is not grounded. Thus, particularly in an instance when means such as a two-prong adapter having a pigtail to ground the neutral conductor is used as mentioned, a hazardous condition arises in that the neutral conductor, which one ordinarily finds safe to handle whether or not it is grounded, is thus energized even if it is not grounded. In the instance mentioned, a person attempting to disconnect the adapter from its outlet might disconnect the pigtail and thus leave it energized before removing the prongs from their sockets. Thus, he would be exposed to an inherent hazard of serious electrical shock.

Thus, it would be highly desirable to provide improved ground protecting circuits possessing the advantages of the circuits disclosed in the preceding paragraphs but eliminating the aforementioned inherent hazard of serious electrical shock.

SUMMARY OF THE INVENTION

It is the principal object of this invention to provide an electrical grounding system incorporating an improved ground protecting circuit.

It is a specific object of this invention to provide an improved ground protecting circuit in an electrical grounding system including a pair of line conductors adapted to be connected to a voltage source to complete a circuit through a load, with one of these conductors also connected to ground through a low impedance path, and further including a neutral conductor adapted to be also connected to ground through a low impedance path.

Preferably, the improved ground protecting circuit of the electrical grounding system comprises a first high impedance network connected between a first line conductor and the third or neutral conductor, a second high impedance network connected between the second line conductor and the third or neutral conductor, and a switch and at least one set of contacts connected in parallel in the circuit through the load between the source and the high impedance networks. Therein, the first high impedance network includes means for closing an otherwise opened set of the contacts if the voltage applied across both high impedance networks is applied substantially fully across the first high impedance network with the first and second line conductors connected to the source such that the second line conductor also is connected to ground through a low impedance path.

The contact closing means may comprise the coil of a relay arranged to close the otherwise opened set of contacts as mentioned. Preferably, these contacts are normally opened and set to be closed if the voltage applied across both high impedance networks is applied substantially fully across the first high impedance network, as mentioned, but to be opened if the same voltage is divided or otherwise proportioned between the high impedance networks. Under certain circumstances, in order to enable these contacts to be reopened, once closed, while the line conductors remain connected, additional but normally closed contacts may be connected in series with the second high impedance network between the second line conductor and the third or neutral conductor. These conductors may be arranged to be opened as the contacts in the circuit through the load are closed. Thus, if the connection of the third or neutral conductor to ground through a low impedance path is opened, as by means of a switch connected in the third or neutral conductor between the point of connection of the third or neutral conductor to ground and the high impedance networks, the voltage applied across both high impedance networks is divided or otherwise proportioned between the high impedance networks, such that the contacts in the circuit through the load are opened, and such that the contacts in series with the second high impedance network are closed. In operation, after the first and second line conductors have been connected to the source such that the second line conductor also is connected to ground through a low impedance path, the switch may be closed momentarily to apply a voltage across both high impedance networks. Then, if the third or neutral conductor is not connected to ground through a low impedance path, the voltage applied across both high impedance networks is divided or otherwise proportioned between the high impedance networks, and the contacts in the circuit through the load remain open. Significantly, the third or neutral conductor remains energized so long as the switch remains closed. Thus, after the switch has been opened, the circuit through the load is opened. However, if the third or neutral conductor is connected to ground through a low impedance path, the same voltage is applied substantially fully across the first high impedance network, and the contacts in the circuit through the load are closed. Thus, after the switch has been opened, these contacts remain closed so long as the third or neutral conductor remains connected to ground through a low impedance path. Then, when the third or neutral conductor is disconnected from ground, the voltage applied across both high impedance networks no longer is applied substantially fully across the first high impedance network but is divided or otherwise proportioned between the high impedance networks, and these contacts are open.

Also, in order to enable the electrical grounding system to operate equivalently when the first and second line conductors are connected to the source with the first line conductor rather than the second line conductor also connected to ground though a low impedance path, the second high impedance network may include means for closing an otherwise opened set of contacts in the circuit through the load if the same voltage is applied substantially fully across the second high impedance network rather than substantially fully across the first high impedance network.

These and other objects, features and advantages of this invention are evident from the following description, with the aid of the accompanying drawings, of several preferred embodiments of this invention.

BRIEF DESCRIPTION OF THE DRAWINGS

In the drawings:

FIG. 1 is a circuit diagram representing a first embodiment of this invention;

FIG. 2 is a circuit diagram representing a second embodiment of this invention;

FIG. 3 is a circuit diagram representing a third embodiment of this invention; and FIG. 4 is a circuit diagram representing a fourth embodiment of this invention.

DESCRIPTION OF THE PREFERRED EMBODIMENTS

In FIG. 1, there is shown an electrical grounding system 10 constituting a first preferred embodiment of this invention and incorporating an improved ground protecting circuit designed to require a connection of the chassis of an electrical apparatus to ground through a low impedance path for operation of the apparatus. Herein, the term "chassis" is used in a general sense to cover any element or elements from which an independent connection to ground through a low impedance path is desired, and the terms "network" and "path" are used interchangeably to refer to a connection between two points in a circuit. Also, herein, the terms "low impedance" and "high impedance" are used comparatively.

The electrical grounding system 10 includes known line conductors, 12 and 14 respectively, adapted to be connected to a conventional alternating current power line or other suitable source (not shown) to complete a circuit through a load (not shown) with one of these conductors also connected to ground through a low impedance path. As indicated at 16, the line conductor 14 is connected to ground through a low impedance path. The electrical grounding system 10 further includes a known neutral conductor 18 connected to the chassis (not shown) of the electrical apparatus (not shown) also comprising the load. The neutral conductor 18 is adapted to be connected to ground through a low impedance path as indicated at 20. In accordance with a common practice, both the line conductors 12 and 14 and the neutral conductor 18 may lead to a non-symmetrical three-prong plug (not shown) adapted to be connected to a suitable three-socket outlet (not shown) in order to facilitate not only proper connection of the line conductors 12 and 14 to the source but also proper connection of the neutral conductor 18 to ground. The ground protecting circuit of the electrical grounding system 10 is designed to open the circuit through the load in the absence of a connection of the neutral conductor 18 to ground through a low impedance path.

In accordance with the principles of this invention, the ground protecting circuit of the electrical grounding system 10 comprises a high impedance network 30 connected between the line conductor 12 and the neutral conductor 18, a high impedance network 32 connected between the line conductor 14 and the neutral conductor 18, and a switch 34 and a set of contacts 36 connected in parallel in the circuit through the load. The high impedance network 30 includes means 38 for closing the otherwise opened contacts 36 if the voltage applied across both high impedance networks 30 and 32 (i.e. from 12a to 14a and vice-versa) is applied substantially fully across the high impedance network 30 (i.e. from 12a to 18a and vice-versa) with the line conductors 12 and 14 connected to the source such that the line conductor 14 also is connected to ground through a low impedance path. As shown, the second high impedance network 32 may be considered to comprise the highly reactive inherent impedance existing between the line conductor 14 and the neutral conductor 18 in the absence of any other connection between these conductors.

As shown, the contact closing means 38 comprise the coil 50 of a relay arranged to close the contacts 36 when the voltage applied across both high impedance networks 30 and 32, as mentioned, is applied substantially fully across the high impedance network 30. Preferably, the contacts 36 are normally opened and set to be closed if the same voltage is applied substantially fully across the high impedance network 30 including the coil 50 of the relay but to be opened if the same voltage is proportioned between the high impedance networks 30 and 32. Thus, if the neutral conductor 18 is not connected to ground through a low impedance path, insufficient current can flow through the coil 50 to ground to close the contacts 36. However, if the neutral conductor 18 is connected to ground through a low impedance path, sufficient current can flow through the coil 50 to close the contacts 36.

Preferably, as shown, the switch 34 and the contacts 36 are connected in parallel in the line conductor 12, in order that the line conductor 12 may not be energized while both the switch 34 and the contacts 36 are opened. However, the switch 34 and the contacts 36 may be connected in parallel in the line conductor 14, with the result that the line conductor 12 may be energized even while both the switch 34 and the contacts 36 are opened. In either instance, the circuit through the load remains opened while both the switch 34 and the contacts 36 are opened.

As shown, the switch 34 is a normally opened momentary switch, and a normally closed momentary switch 52 is connected in the neutral conductor 18 between the point of connection of the neutral conductor 18 to ground and the high impedance networks 30 and 32. Alternatively, the switch 52 may be located in series with the high impedance network 30 between the line conductor 12 and the neutral conductor 18. In operation, after the line conductors 14 and 16 have been connected to the source as mentioned, the switch 34 may be closed momentarily to apply a voltage across both high impedance networks 30 and 32. Then, if the neutral conductor 18 is not connected to ground through a low impedance path, the voltage applied across both high impedance networks 30 and 32 is proportioned between the high impedance networks 30 and 32, and the contacts 36 remain opened. Significantly, then, the neutral conductor 18 remains energized only so long as the switch 34 remains closed. Thus, after the switch 34 has been opened, the circuit through the load is opened. However, if the neutral conductor 18 is connected to ground through a low impedance path, the same voltage is applied substantially fully across the high impedance network 30, and the contacts 36 are closed. Thus, after the switch 34 has been opened, the contacts 36 remain closed so long as the neutral conductor 18 remains connected to ground through a low impedance path with no change in the connections of the line conductors 12 and 14. Then, when the neutral conductor 18 no longer is connected to ground through a low impedance path, the voltage applied across both high impedance paths 39 and 32 no longer is applied substantially fully across the high impedance network 30 but is proportioned between the high impedance networks 30 and 32, and the contacts 36 are opened. The switch 52 may be used to selectively open and close the circuit from the line conductor 12 to the neutral conductor 18 through the high impedance network 30.

The embodiment of FIG. 2 is similar to the embodiment of FIG. 1 except in that the high impedance network 32 can carry substantial current even when the neutral conductor 18 is not connected to ground through a low impedance path. Under these circumstances, in order to enable the contacts 36 to be reopened, once closed, while the line conductors 12 and 14 remain connected, additional but normally closed contacts 54, which are arranged to be opened by the relay comprising the coil 50 as the contacts 36 are closed, may be connected in series with the high impedance network 32 between the line conductor 14 and the neutral conductor 18. Alternatively, if the contacts 54 are omitted, the contacts 36 may be set to be opened at the lower level of current carried by the coil 50 when the voltage applied across both high impedance networks 30 and 32 is divided or otherwise proportioned between the high impedance networks 30 and 32, in comparison with the higher level of current carried by the coil 50 when the same voltage is applied substantially fully across the high impedance network 30. Again alternatively, if the contacts 54 are omitted, the high impedance network 32 may comprise a coil arranged to produce a flux effectively cancelling the flux produced by the coil 50 as substantial current is carried by both coils.

Often, either through oversight or by design, the polarity of the line-connected sockets of an otherwise suitable three-socket outlet may be reversed in comparison with the line-connected prongs of a non-symmetrical three-prong plug. Thus, the specific connections of the respective line conductors 12 and 14 are significant if both the line conductors 12 and 14 and the neutral conductor 18 lead to such a non-symmetrical three-prong plug. The respective embodiments of FIGS. 1 and 2 are polarity-sensitive in that each requires the line conductor 14 rather than the line conductor 12 to be connected to ground through a low impedance path. However, as explained below, the embodiments of FIGS. 3 and 4 are not polarity-sensitive.

In FIG. 3, there is shown an electrical grounding system 110 also incorporating an improved ground protecting circuit designed to require a connection of the chassis of electrical apparatus to ground through a low impedance path. Again, the electrical grounding system 110 includes known line conductors, 112 and 114 respectively, adapted to be connected to a conventional alternating current power line or other suitable source (not shown) to complete a circuit through a load (not shown) with one of these conductors also connected to ground through a low impedance path. As indicated at 116, the line conductor 114 is connected to ground through a low impedance path. Alternatively, the line conductor 112 may be connected to ground through a low impedance path. Again, the electrical grounding system 110 further includes a known neutral conductor 118 connected to the chassis (not shown) of the electrical apparatus (not shown) also comprising the load. The neutral conductor 118 is adapted to be connected to ground through a low impedance path as indicated at 120. Again in accordance with common practices, both the line conductors 112 and 114 and the neutral conductor 118 may lead to a non-symmetrical three-prong plug (not shown) in order to facilitate not only proper connection of the line conductors 112 and 114 to the source but also proper connection of the neutral conductor 118 to ground. The ground protecting circuit of the electrical connector 110 is designed to open the circuit through the load in the absence of a connection of the neutral conductor 118 to ground through a low impedance path.

In accordance with the principles of this invention, the ground protecting circuit of the electrical grounding system 110 comprises a high impedance network 130 connected between the line conductor 112 and the neutral conductor 118, a high impedance network 132 connected between the line conductor 114 and the neutral conductor 118, a switch 134a and a set of contacts 136a connected in parallel in the line conductor 112 between the source and the high impedance network 130, and a switch 134b and a set of contacts 136b connected in parallel in the line conductor 114 between the source and the high impedance network 132. The high impedance network 130 includes means 138 for closing the otherwise opened contacts 136a and 136b if the voltage applied across both high impedance networks 130 and 132 (i.e. from 112a to 114a and vice-versa) is applied substantially fully across the high impedance network 130 (i.e. from 112a to 118a and vice-versa) with the line conductors 112 and 114 connected to the source such that the line conductor 114 also is connected to ground through a low impedance path. The high impedance network 132 includes means 148 for closing the otherwise opened contacts 136a and 136b if the voltage applied across both high impedance networks 130 and 132 is applied substantially fully across the high impedance network 132 (i.e. from 114a to 118a and vice-versa) with the line conductors 112 and 114 connected to the source such that the line conductor 112 rather than the line conductor 114 also is connected to ground through a low impedance path.

The provision of separate switches 134a and 134b and separate sets of contacts 136a and 136b in the respective line conductors 112 and 114 is preferred in order that neither the line conductor 112 nor the line conductor 114 may be energized while both the switches 134a and 134b and the contacts 136a and 136b are opened. However, either the switch 134a or the switch 134b may be omitted together with the contacts 136a or 136b connected in parallel with the switch to be omitted. As a result, if the switch 134a and the contacts 136a are omitted with the line conductor 114 connected to ground through a low impedance path as indicated at 116, the line conductor 112 may be energized even while both the remaining switch 134b and the remaining contacts 136b are opened, and, if the switch 134b and the contacts 136b are omitted with the line conductor 112 rather than the line conductor 114 connected to ground through a low impedance path, the line conductor 114 may be energized even while both the remaining switch 134a and the remaining contacts 136a are opened. In either instance, the circuit through the load remains opened while both the remaining switch 134a or 134b and the remaining contacts 136a or 136b are opened.

As shown, the switches 134a and 134b are normally opened momentary switches, and a normally closed momentary switch 152 is connected in the neutral conductor 118 between the point of connection of the neutral conductor 118 to ground and the high impedance networks 130 and 132. Alternatively, separate normally closed momentary switches (not shown) may be arranged to be conjointly opened and closed and may be connected respectively in series with the respective high impedance networks 130 and 132 between the respective line conductors 112 and 114 and the neutral conductor 118. Preferably, the switches 134a and 134b are arranged to be conjointly opened and closed. In operation, after the line conductors 112 and 114 have been connected to the source as mentioned, the switches 134a and 134b may be closed momentarily to apply a voltage across both high impedance networks 130 and 132. Then, if the neutral conductor 118 is not connected to ground through a low impedance path, the voltage applied across both high impedance networks 130 and 132 is proportioned and preferably divided between the high impedance networks 130 and 132, and the contacts 136a and 136b remain opened. Significantly, then, the neutral conductor 118 remains energized only so long as the switches 134a and 134b remain closed. After the switches 134a and 134b have been opened, the circuit through the load is opened. However, if the line conductor 112 is connected to ground through a low impedance path as indicated at 116, and if the neutral conductor 118 is connected to ground through a low impedance path as indicated at 20, the same voltage is applied substantially fully across the high impedance network 130, and the contacts 136a and 136b are closed. Alternatively, if the line conductor 114 rather than the line conductor 112 is connected to ground through a low impedance path, and if the neutral conductor 118 is connected to ground through a low impedance path as indicated at 120, the same voltage is applied substantially fully across the high impedance network 132, and the contacts 136a and 136b are closed. In either instance, after the switches 134a and 134b have been opened, the contacts 136a and 136b remain closed so long as the neutral conductor 118 remains connected to ground through a low impedance path with no change in the connections of the line conductors 112 and 114. Then, when the neutral conductor 118 no longer is connected to ground through a low impedance path, the voltage applied across both high impedance networks 130 and 132 no longer is applied substantially fully either across the high impedance network 130 or across the high impedance network 132 but is proportioned and preferably divided between the high impedance networks 130 and 132, and the contacts 136a and 136b are opened. The switch 152 may be used to selectively open and close the circuit from the non-grounded conductor 112 or 114 to the neutral conductor 118 through the associated high impedance network 130 or 132.

As shown, the contact closing means 138 may comprise the coil 150 of one relay arranged to close the contacts 136a and 136b when the voltage applied across both high impedance networks 130 and 132 is applied substantially fully across the high impedance network 130 as mentioned, and the contact closing means 148 may comprise the coil 160 of another relay also arranged to close the contacts 136a and 136b when the same voltage is applied substantially fully across the high impedance network 132 as mentioned. Both high impedance networks 130 and 132 can carry substantial current when the neutral conductor 118 is not connected to ground through a low impedance path. Under these circumstances, in order to enable the contacts 136a and 136b to be reopened, once closed, while either the line conductors 112 and 114 remain connected as mentioned, additional but normally closed contacts 154, which are arranged to be opened by the relay comprising the coil 150, may be connected in series with the high impedance network 132 between the line conductor 114 and the neutral conductor 118, and additional but normally closed contacts 164 which are arranged to be opened by the relay comprising the coil 160, may be connected in series with the high impedance network 130 between the line conductor 112 and the neutral conductor 118. Alternatively, if the contacts 154 and 164 are omitted, the contacts 136a and 136b may be set to be opened at the lower level of current carried by the coils 140 and 160 when the voltage applied across both high impedance networks 130 and 132, as mentioned, is divided between the high impedance networks 130 and 132, in comparison either with the higher level of current carried by the coil 150 when the same voltage is applied substantially fully across the high impedance network 130 or with the higher level of current carried by the coil 160 when the same voltage is applied substantially fully across the high impedance network 132. Again alternatively, if the contacts 154 and 164 are omitted, the respective coils 150 and 160 may be arranged for each to produce a flux effectively cancelling the flux produced by the other as substantial current is carried by both coils.

The embodiment of FIG. 4 is similar to the embodiment of FIG. 3 except in that, for each of the contact closing means 138 and 148, separate sets of contacts equivalent to the contacts 136a are connected in parallel and separate sets of contacts equivalent to the contacts 136b are connected in parallel. As shown, the contact closing means 138 is arranged both to close contacts 166a and 166b connected respectively in parallel with the switches 134a and 134b and to open the contacts 154 connected in series with the high impedance network 132 between the line conductor 114 and the neutral conductor 118 when the voltage applied across both high impedance networks 130 and 132, as mentioned, is applied across the high impedance network 130, and the contact closing means 148 is arranged both to close contacts 176a and 176b also connected respectively in parallel with he switches 134a and 134b and to open the contacts 164 connected in series with the high impedance network 130 between the line conductor 112 and the neutral conductor 118 when the same voltage is applied across the high impedance network 132 as mentioned.

In the embodiment of FIG. 4, a warning lamp 180 in series both with normally closed contacts 182 operable conjointly with the contacts 166a and 166b and with normally closed contacts 184 operable conjointly with the contacts 176a and 176b and a running lamp 186 are connected in parallel across the line conductors 112 and 114 between the high impedance networks 130 and 132 and the load. Thus, the warning lamp 180 may be illuminated when the switches 134a and 134b are closed, if neither the contacts 166a and 166b are closed, and the running lamp 186 may be illuminated when the circuit through the load is closed. Of course, similar warning and running lamps could be connected similarly in any of the previously described embodiments of this invention.

Thus, it will be appreciated that all of the recited objects, advantages and features of this invention have been demonstrated as obtainable in a highly practical apparatus and one that is simple and positive in operation. It will be further understood that although this invention has been described with respect to certain specific embodiments thereof, this invention is not limited thereto, since various modifications of said invention will suggest themselves from the aforesaid description and are intended to be encompassed within the scope of the appended claims wherein there is claimed.

I claim:

1. In an electrical grounding system for grounding the chassis of electrical apparatus comprising a load, said system including first conductor adapted to conduct electrical power from a source to the load and a second conductor adapted to return electrical power from the load to the source and to connect the load to a ground reference point through a low impedance path and further including a third conductor adapted to connect the chassis to the ground reference point through a low impedance path, the combination comprising a first high impedance network connected between said first and third conductors, a second high impedance network connected between said second and third conductors, and a normally opened momentary switch and at least one set of contacts connected in parallel in said first conductor between the source and said first high impedance network, said first high impedance network including relay means for closing an otherwise opened set of said contacts if as said switch is closed momentarily the voltage applied between said first and second conductors and across both of said high impedance networks is applied substantially fully across said first impedance network when electrical power is conducted from the source to the load by said first conductor and returned from the load to the source by said second conductor with said third conductor connecting the chassis to the ground reference point.

2. The combination of claim 1 wherein a switch is connected to selectively open and close the circuit from said first conductor to said third conductor through said first high impedance network.

3. The combination of claim 2 wherein and the other switch is a normally closed momentary switch.

4. The combination of claim 1 wherein said contact closing means is arranged to open otherwise closed contacts connected in series with said second high impedance network between said second and third conductors as the otherwise opened set of contacts are closed.

5. The combination of claim 4 wherein a switch is connected in said third conductor between the point of connection of said third conductor to ground and said high impedance networks.

6. In an electrical grounding system for grounding the chassis of electrical apparatus comprising a load, said system including first and second conductors adapted to be connected between a source and the load, such that one of said conductors is adapted to conduct electrical power from the source to the load and the other of said conductors is adapted to return electrical power from the load to the source and to connect the load to a ground reference point through a low impedance path, and further including a third conductor adapted to connect the chassis to the ground reference point through a low impedance path, the combination comprising a first relay means connected between said first and third conductors, a second relay means connected between said second and third conductors, a normally opened momentary first switch and at least one set of first contacts connected in parallel in said first conductor between the source and said first relay means, a second normally opened momentary second switch and at least one set of second contacts connected in parallel in said second conductor between the source and the second relay means, said switches being arranged for conjoint operation, said first relay means closing said otherwise opened set of said first contacts if as said switches are closed momentarily the voltage applied between said first and second conductors and across both of said high impedance networks is applied substantially fully across said first relay means and said second relay means closing said otherwise opened set of said second contacts if as said switches are closed momentarily such voltage is applied substantially fully across said second relay means, when electrical power is conducted from the source to the load by one of said first and second conductors and returned from the load to the source by the other of said first and second conductors with said third conductor connecting the chassis to the ground reference point.

7. The combination of claim 6 wherein separate sets of said contacts are connected in parallel for each of said relay means.

8. The combination of claim 6 wherein a switch is connected in said third conductor between the point of connection of said third conductor to ground and said high impedance networks.

9. The combination of claim 6 wherein separate sets of said first contacts are connected in parallel for each of said relay means and separate sets of said second contacts are connected in parallel for each of said contact closing means.

10. The combination of claim 5 wherein the first relay means is arranged to close otherwise opened contacts connected in series with said second relay means between said second and third conductors as the otherwise opened set of first contacts closable by said first relay means are closed, and wherein the second relay means is arranged to open otherwise closed contacts connected in series with said first relay means between said first and third conductors as the otherwise opened set of second contacts closable by said second relay means are closed.

11. The combination of claim 10 wherein a switch is connected in said third conductor between the point of connection of said third conductor to ground and said high impedance networks.

* * * * *